United States Patent [19]
Henderson

[11] Patent Number: 5,203,658
[45] Date of Patent: Apr. 20, 1993

[54] BALE FEEDER

[75] Inventor: Allan W. Henderson, Invercargill, New Zealand

[73] Assignee: Marlene Ruth Henderson, New Zealand; a part interest

[21] Appl. No.: 702,613

[22] Filed: May 17, 1991

[30] Foreign Application Priority Data

May 18, 1990 [NZ] New Zealand ............ 233727

[51] Int. Cl.⁵ ............................................. A01D 90/14
[52] U.S. Cl. .................................... 414/24.6; 222/614; 241/101.7; 414/911
[58] Field of Search .................. 222/614; 241/101 A, 241/101.7; 414/24.5, 24.6, 911

[56] References Cited

U.S. PATENT DOCUMENTS

| | | | |
|---|---|---|---|
| 1,617,228 | 2/1927 | Woodward | 222/614 |
| 4,044,967 | 8/1977 | Guichon | 414/911 X |
| 4,741,656 | 5/1988 | Bishop | 414/111 X |
| 4,944,352 | 7/1990 | Brouwer et al. | 414/911 X |
| 4,968,205 | 11/1990 | Biasotto et al. | 414/24.6 |

Primary Examiner—Michael S. Huppert
Assistant Examiner—Janice Krizek

[57] ABSTRACT

A forage feed out machine, the machine comprising; a cradle with a series of transverse rollers extending across and forming a base for a bale; the cradle being mounted on a chassis and wheels such that it is pivotable backward and forward by hand; at least one of the rollers being ground driven. The width and the height of the cradle is such that a range of different sized bales, preferably round, can be loaded and fed out by the machine. A main roller which feeds out the feed has a ridge along its surface, this ridge providing a means for intermittently feeding out forage material in discrete clumps from the periphery of the bale. The ridge acts as a blade or paddle which removes the feed from the periphery of the bale and also initially raises and moves the bale. The cradle is formed by a pair of side frame members linked by three spaced apart transversely extending rollers on which the bale is supported, the bale being retained in position by transverse pins positioned at the center of each side of the bale and adapted to slide in guide slots formed in the side frames as the bale's size reduces during feeding out.

8 Claims, 3 Drawing Sheets

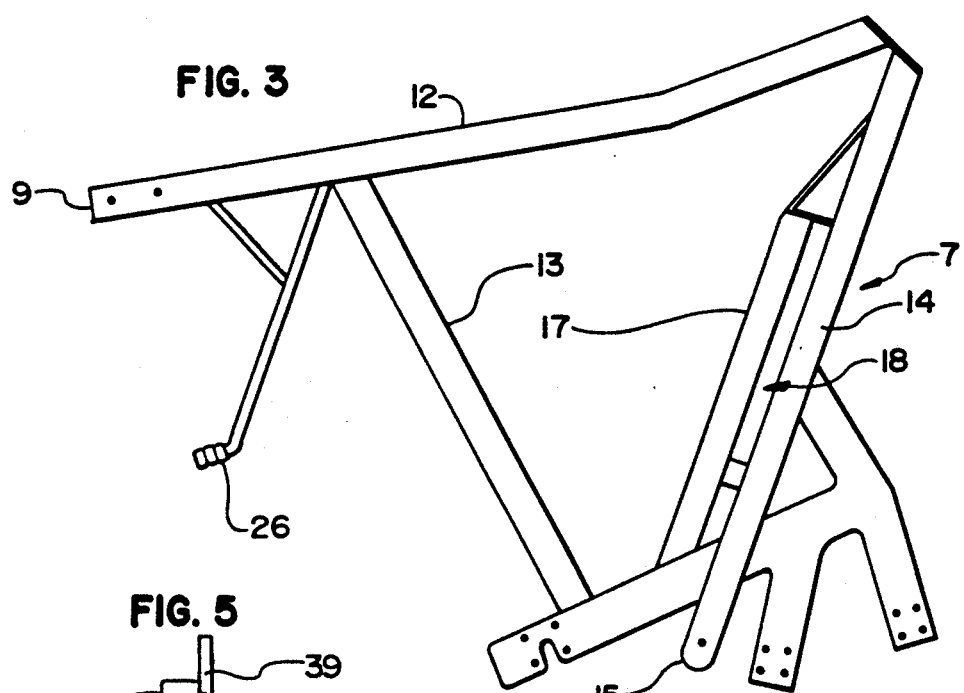
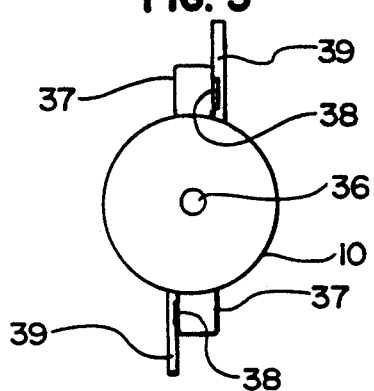
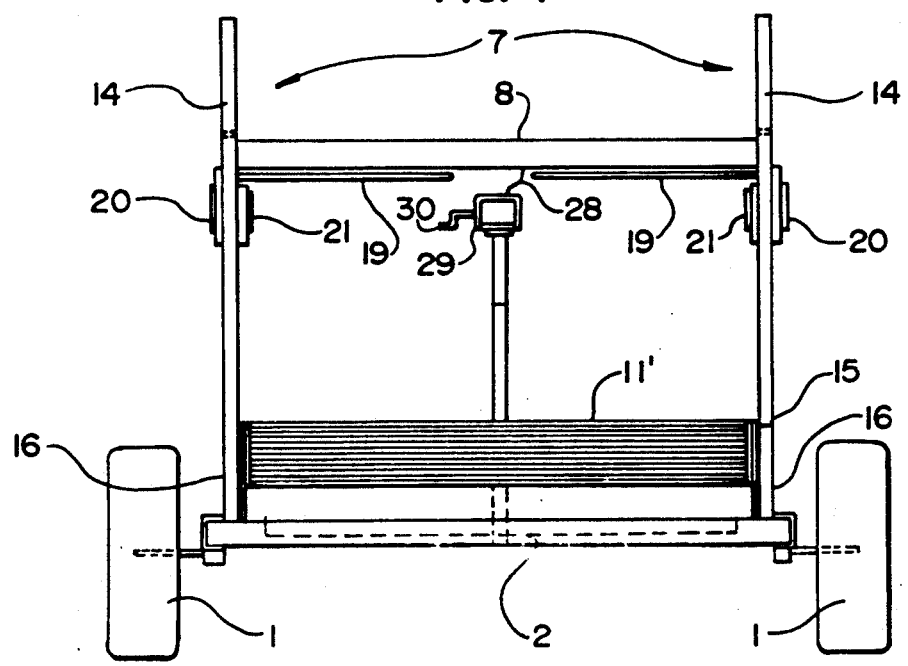

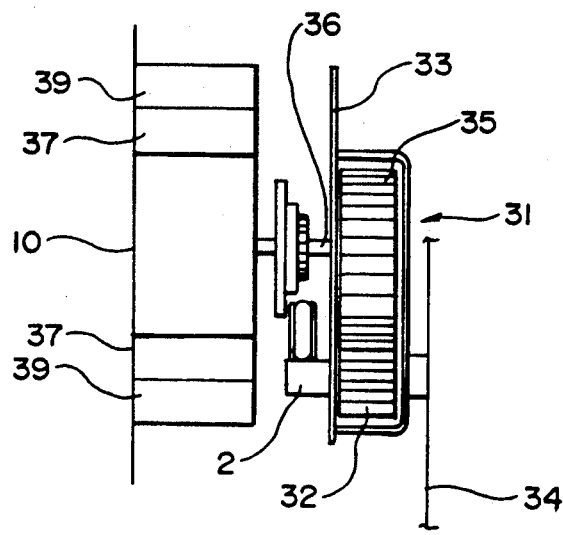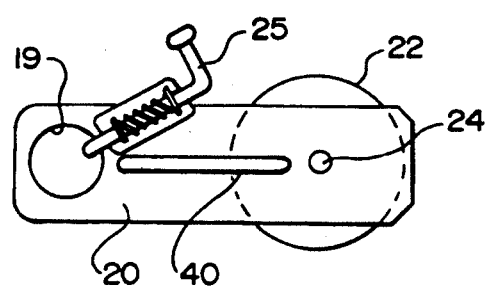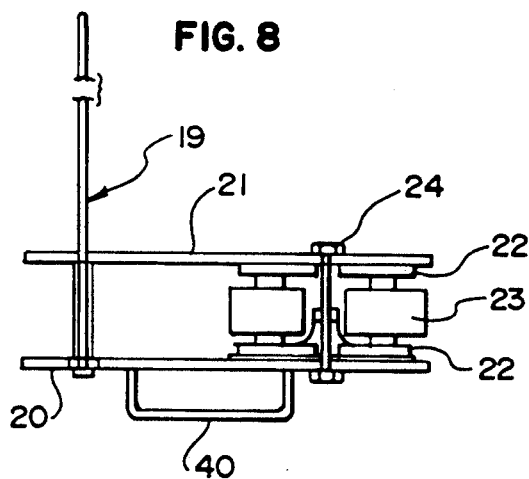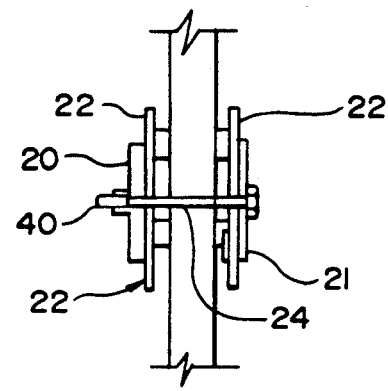

BALE FEEDER

FIELD OF THE INVENTION

This invention relates to a forage feed out machine. The machine is particularly useful for feeding out large hay bales.

BACKGROUND TO THE INVENTION

It is known to use forage feed out machines to supply supplementary feed to stock. These machines are often hydraulically operated and hence require a significant power input to operate. These machines are expensive to manufacture and maintain. Further known feed out machines are often heavy because of the need for ancillary equipment (e.g. hydraulic pumps) which make them unsuitable for operating in wet ground conditions where soil is saturated with water.

Often it is a requirement, if stock are physiologically stressed or are bearing/rearing young, that the supplementary feed is fed out quietly. Unfortunately many known feed out machines are operated by a tractor or a large vehicle which creates a large amount of noise which can be distressing to stock in this condition. In addition the use of heavy machines can compact soil under wet conditions.

It will also be appreciated that if a long continuous supply of feed is laid on the ground by a feed out machine the feeding stock, which by nature gather in small mobs, tend to trample/foul the fed out forage material. This problem can be overcome by feeding the forage material in distinct and discreet lumps/clumps and this is compatible with the feeding habits of the stock i.e., in discreet mobs. Unfortunately many of the known feed out machines do not have a means for feeding out forage in distinct lumps, therefore the feeding stock tend to waste some of the material by trampling/fouling the material.

Such known feed out machines comprises many moving parts and as heavy wear occurs to the moving parts, when operating under dusty or muddy conditions as is often the case when feeding out dry hay or feeding out hay in wet conditions, they are costly to maintain. This heavy wear can result in breakdowns which are inconvenient and/or cause a loss of production.

Accordingly, it is an object of this invention to overcome the above identified disadvantages and provide a forage feed out machine which has the ability to feed out material with a minimum of waste, has a minimal number of moving parts and can operate with a low input of power.

SUMMARY OF THE INVENTION

Broadly this invention provides a forage feed out machine, the machine comprising; a cradle with a series of transverse rollers extending across and forming a base for a bale; the cradle being mounted on a chassis and wheels such that it is pivotable backward and forward by hand; at least one of the rollers being ground driven.

Conveniently the width and the height of the cradle is such that a range of different sized bales, preferably round, which depends on the make of the round baler in which they are made and the moisture status of the hay when it is baled, can be loaded by hand and fed out by the machine.

Preferably a main roller which feeds out the feed has a ridge along its surface, this ridge providing a means for intermittently feeding out forage material in discreet clumps from the periphery of the bale. The ridge can be formed in a number of ways and is preferably formed as a length of box section tube extending across the full width of the roller. One face of the tube can have an attached member which extends radially outward from the surface of the roller. The member acts as a blade or paddle which removes the feed from the periphery of the bale and also initially raises and moves the bale.

The cradle can be formed by a pair of side frame members linked by three spaced apart transversely extending rollers on which the bale is supported, the bale being retained in position by transverse pins positioned at the centre of each side of the bale and adapted to slide in guide slots formed in the side frames as the bale's size reduces during feeding out.

Conveniently, the means which drives the rollers comprises a series of gears which are constructed from either steel or a plastics material to allow them to be produced at a reasonable price and at the same time be durable under dusty, muddy and/or wet conditions.

It will be appreciated that the cradle can be readily disengaged from the chassis, freeing the chassis to have a deck attached therefore allowing the chassis to be used for a trailer when feed is not being fed out.

Conveniently, the machine has a means for loosening the forage material from the bale to allow it to feed out hay baled by different makes of round baler, and hay that has been baled at a variety of moisture contents.

Preferably the machine is dimensioned and constructed to be towed by a small farm vehicle such as a farm bike and the chassis has a suitable towbar connection.

BRIEF DESCRIPTION OF THE DRAWINGS

FIG. 3 is a side view of a side frame of the cradle of the forage bale feed out machine shown in FIGS. 1 and 2.

FIG. 4 is a rear view of the forage bale feed out machine shown in FIGS. 1 and 2.

FIG. 5 is a detail from the side of the main roller incorporated in the machine shown in FIGS. 1 to 4.

FIG. 6 is a section on the lines VI—VI shown in FIG. 2.

FIG. 7 is an elevational detail of the region A shown in FIG. 1.

FIG. 8 is a plan view of the detail shown in FIG. 7.

FIG. 9 is a vertical section through the detail shown in FIGS. 7 and 8.

DESCRIPTION OF A PREFERRED EMBODIMENT

Figure 1:
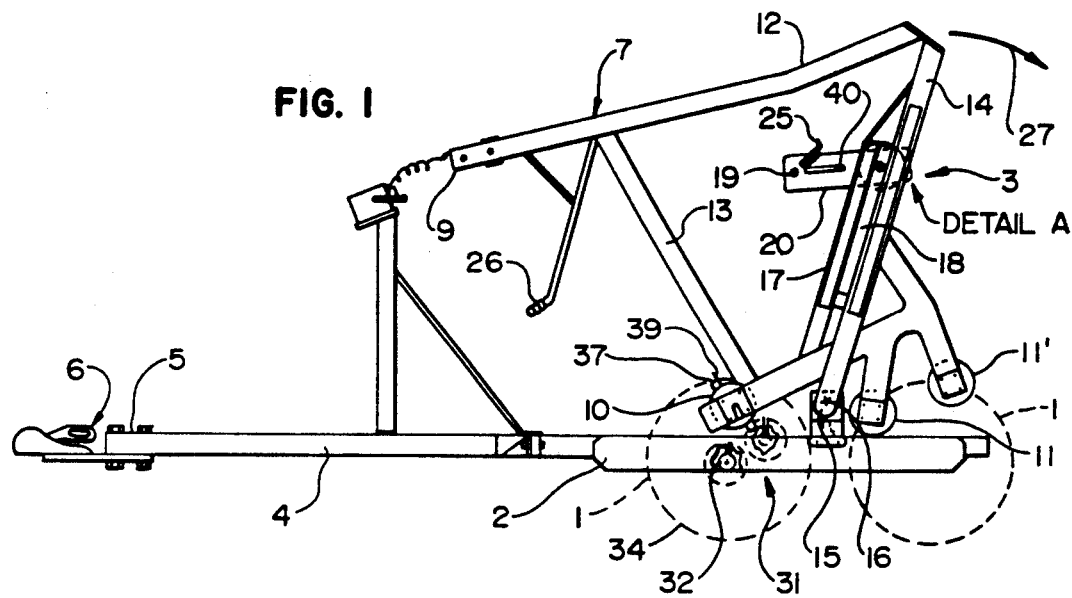
FIG. 1 is a side view of a forage bale feed out machine according to the invention.
Figure 2:
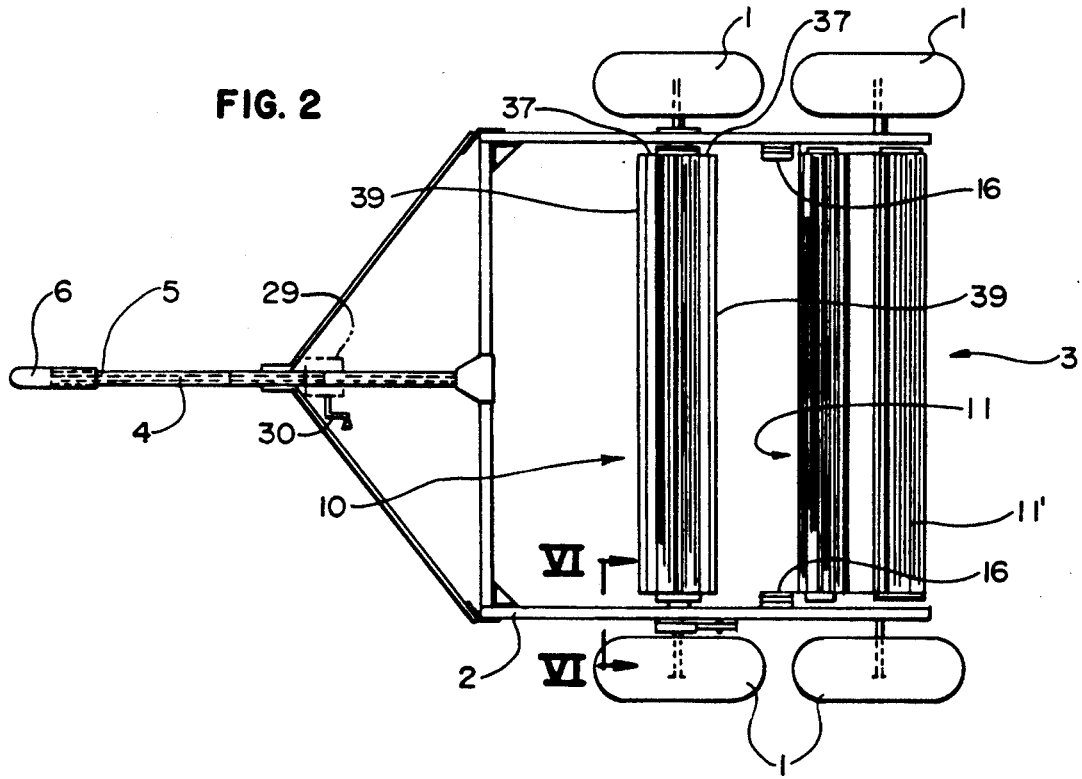
FIG. 2 is a plan view of the forage bale feed out machine shown in FIG. 1.

Referring to the drawings and particularly to FIGS. 1, 2 and 4 a feed out machine is shown comprising wheels 1, chassis 2 and forage bale cradle generally indicated by arrow 3. The chassis 2 has a draw bar 4 at the forward end 5 of which is a trailer coupling 6 the position of which is adjustable to either above or below the level of the drawbar 4. The chassis 2 supports the cradle 3 which consists of a pair of side frames 7 (one of which is shown in FIG. 3). The side frames 7 are linked by a transverse member 8 at their forward end 9 and the linked frames 7 support a main roller 10 and a pair of other rollers 11, 11'. The frames 7 include arm 12, brace 13, and guide member 14. The guide members 14 have at their lower ends 15 removable pivot or lynch pins 16 usable to connect the side frames 7 to the chassis 2. Each guide member 14 has parallel thereto a member 17 between which is formed a guide slot 18.

The guide slot 18 of each side frame 7 supports a transverse pin 19 by plates 20 and 21. The plate 20 has a handle 40 and is held spaced from the plate 21 by discs 22 spaced by brass or plastic bearing plates 23 which are linked by bolt 24. The transverse pin or spike 19 can move in aligned holes in the plates 20, 21 and is locked in position by a spring biased locking pin 25.

Each frame 7 has a handle 26 usable to pivot the frame from its forward position (FIG. 1) in the direction of arrow 27 until the roller 11' contacts the ground.

The centre of the transverse member 8 has a connection (not shown) for a cable 28, the other end of which is connected to a winch reel 29 rotatable by handle 30. To load a round bale onto the cradle it is pivoted, at the pivot pin 16, so that the back roller 11' touches the ground. The pins or spikes 19 are then inserted through slots 18 into the centre of the bale to secure the bale to the cradle 3.

The cradle 3 is then pulled back into the operating position by the winch mechanism 29 which is advantageously hand operated. The machine is then towed to the site where the feed is to be fed out. The strings on the bale are cut and removed. A drive mechanism 31 which includes drive cog 32 is driven by the wheel 34 when the machine moves. The cog 32 is movable to a position where is meshes via an idler cog with the cog 35 on a shaft 36 of the main roller 10, when it is engaged by a lever 33. The bale then begins to revolve in an anticlockwise direction under the action of the roller 10 and the hay material unravels onto the ground. On the surface of roller 10 there is a bar 37 along its edge. The bar 37 can be formed from a length of box section tube extending across the full width of the roller 10. One face 38 of the bar 37 can have an attached upstanding bar 39 which extends radially outward from the surface of the roller 10. The bar 37 or the ridge on the roller 10 breaks the flow of the unravelling hay material causing intermittent clumps to be laid on the ground, thus reducing wastage by live stock. As the bale is being unravelled the centre pins 19 are able to rise and drop about its point of rotation in guide slot 18. As the hay material unravels the circumference of the bale decreases and the point of rotation moves down. Accordingly the pins 19 are able to compensate for this change in bale circumference.

It will be appreciated that numerous variations and modifications can be made to the embodiment described in this specification without departing from the scope of the invention. For example the size of the bale cradle can be reduced or increased to compensate for the different sized round bales which are currently produced; either in half tonne or 1 tonne sized bales.

What I do claim and desire to obtain by Letters Patent of the United States is:

1. A forage material feed out machine, the machine comprising: a cradle; a series of transverse rollers extending across the cradle, the transverse rollers forming a base for a bale; the cradle being mounted on a chassis and wheels such that the cradle is pivotable backward to contact a bale to be loaded into the cradle, the bale being retained relative to the cradle by transverse pins positioned at the centre of each side of the bale, the pins retaining the bale relative to the cradle during material feed out, the cradle being pivoted forward by hand to load the bale onto the chassis; at least one of the transverse rollers being ground driven to remove forage material from the periphery of the bale during feed out.

2. A machine as claimed in claim 1 wherein a main roller which feeds out the forage material has a ridge along its surface, this ridge providing a means for intermittently feeding out forage material in discreet clumps from the periphery of the bale.

3. A machine as claimed in claim 1 wherein the cradle is formed by a pair of side frame members linked by three spaced apart transversely extending rollers, the transverse pins being adapted to slide in guide slots formed in the side frames as the bale's size is reduced during feeding out.

4. A machine as claimed in claim 3 wherein a ridge is formed from a length of box section tube extending across the full width of the roller with one face of the tube having an attached member which extends radially outward from the surface of the roller.

5. A machine as claimed in claim 3 wherein the rollers are driven by a series of gears which are constructed from either steel or a plastic material.

6. A machine as claimed in claim 5 wherein the cradle can be readily disengaged from the chassis.

7. A machine as claimed in claim 6 wherein the machine incorporates a means for loosening the forage material from the bale to allow it to feed out hay baled by different makes of round baler, and hay that has been baled at a variety of moisture contents.

8. A machine as claimed in claim 7 wherein the machine is dimensioned and constructed to be towed by a farm vehicle and the chassis has a suitable towbar connection.

* * * * *